(12) United States Patent
Holland et al.

(10) Patent No.: US 8,153,228 B2
(45) Date of Patent: Apr. 10, 2012

(54) PROTECTIVE COVER FOR SLINGS, ROPES, CABLES AND THE LIKE

(75) Inventors: John E. Holland, Bailey, NC (US); Connie W. Holland, Bailey, NC (US)

(73) Assignee: JHRG, LLC, Spring Hope, NC (US)

( * ) Notice: Subject to any disclaimer, the term of this patent is extended or adjusted under 35 U.S.C. 154(b) by 324 days.

(21) Appl. No.: 12/582,956

(22) Filed: Oct. 21, 2009

(65) Prior Publication Data

US 2011/0091682 A1    Apr. 21, 2011

(51) Int. Cl.
*A44B 18/00*     (2006.01)
*B32B 3/06*      (2006.01)

(52) U.S. Cl. ..... 428/100; 428/34.1; 428/34.3; 428/35.7; 428/36.1; 428/36.9; 428/36.92; 428/98; 428/99; 442/148

(58) Field of Classification Search .................. 428/100, 428/34.1, 34.3, 35.7, 36.1, 36.9, 36.92, 98, 428/99; 442/148

See application file for complete search history.

(56) References Cited

U.S. PATENT DOCUMENTS

| | | |
|---|---|---|
| 3,192,589 A | 7/1960 | Pearson |
| 4,169,303 A | 10/1979 | Lemelson |
| 4,448,569 A | 5/1984 | Hackman et al. |
| 4,454,183 A | 6/1984 | Wollman |
| 4,775,310 A | 10/1988 | Fischer |
| 4,784,890 A | 11/1988 | Black |
| 5,492,383 A | 2/1996 | Kentner, Sr. |
| 5,498,047 A | 3/1996 | Treuling |
| 5,761,775 A | 6/1998 | Legome et al. |
| 6,280,546 B1 | 8/2001 | Holland et al. |
| 6,484,371 B1 | 11/2002 | Romanko et al. |
| 7,240,475 B2 | 7/2007 | Smeets et al. |
| 7,475,926 B2 | 1/2009 | Summars |
| 7,498,278 B2 | 3/2009 | Holland et al. |
| 7,622,406 B2 | 11/2009 | Holland et al. |
| 2002/0170728 A1 | 11/2002 | Holland et al. |

(Continued)

FOREIGN PATENT DOCUMENTS

JP     06-051295 U     7/1994

(Continued)

OTHER PUBLICATIONS

International Search Report and Written Opinion for International Application No. PCT/US10/53369, mailed Jul. 28, 2011.

(Continued)

*Primary Examiner* — Brent Ohern
(74) *Attorney, Agent, or Firm* — Womble Carlyle Sandridge & Rice, LLP

(57) ABSTRACT

A protective cover formed substantially of ultra high molecular weight polyethylene yarns and having first and second opposing edges connected by a high shear strength hook and loop fastener system. The high shear strength hook and loop fastener system includes areas of a plurality of high shear strength hooks along opposing edges of the cover and an intermediate disposable strip having a plurality of loops on both sides of the strip configured to be received between the areas having the plurality of hooks. The cover wraps around the sling so that a portion of the first edge and second edge overlap with the intermediate disposable strip to form the releasable connection. When the edges are released, the intermediate strip may be replaced, when worn, by a new intermediate strip with the remainder of the cover and fastener system being reusable.

9 Claims, 4 Drawing Sheets

U.S. PATENT DOCUMENTS

| | | |
|---|---|---|
| 2005/0062303 A1 | 3/2005 | Hess |
| 2008/0061572 A1 | 3/2008 | Harada et al. |
| 2009/0051181 A1 | 2/2009 | Goossens et al. |

FOREIGN PATENT DOCUMENTS

| | | |
|---|---|---|
| KR | 10-0648009 B1 | 11/2006 |
| WO | WO 2007-071310 A1 | 6/2007 |

OTHER PUBLICATIONS

English Translation of the abstract of JP 06-051295 U (Tamai Yuji et al.) Jul. 12, 1994.

English Translation of the abstract of KR 10-0648009 B1 (Jungae Kim) Nov. 23, 2006.

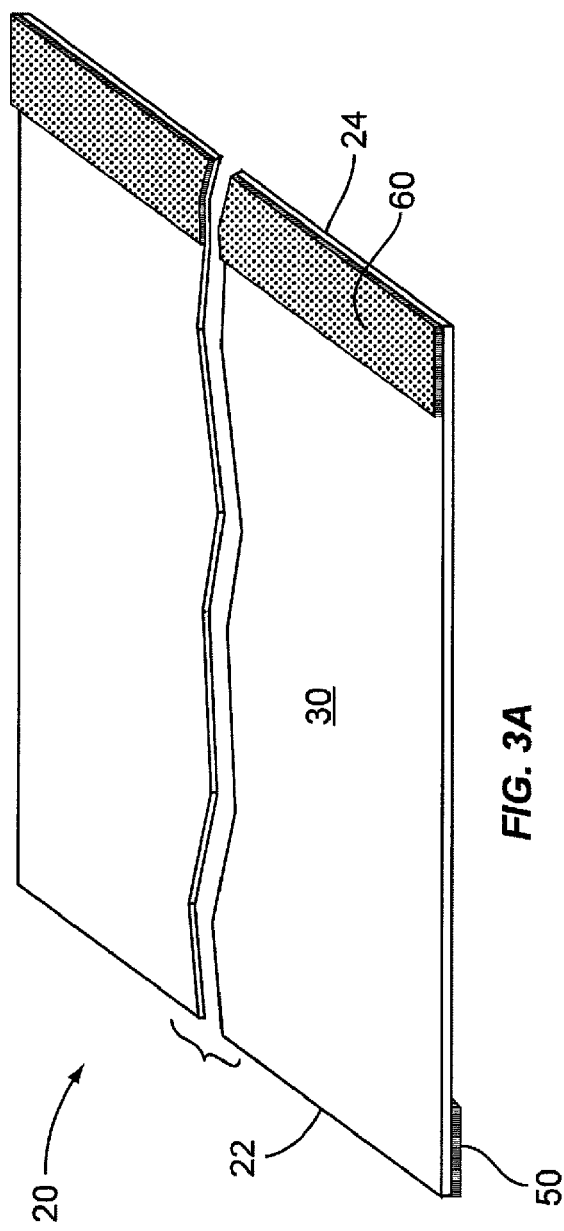
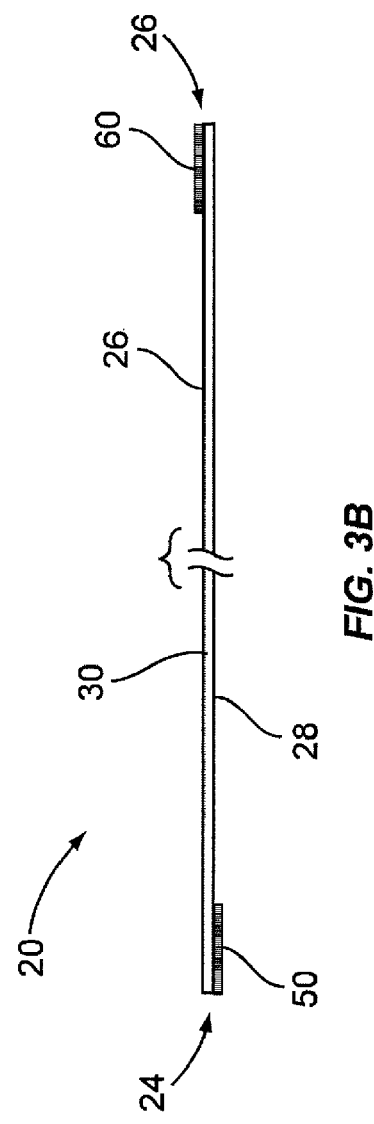

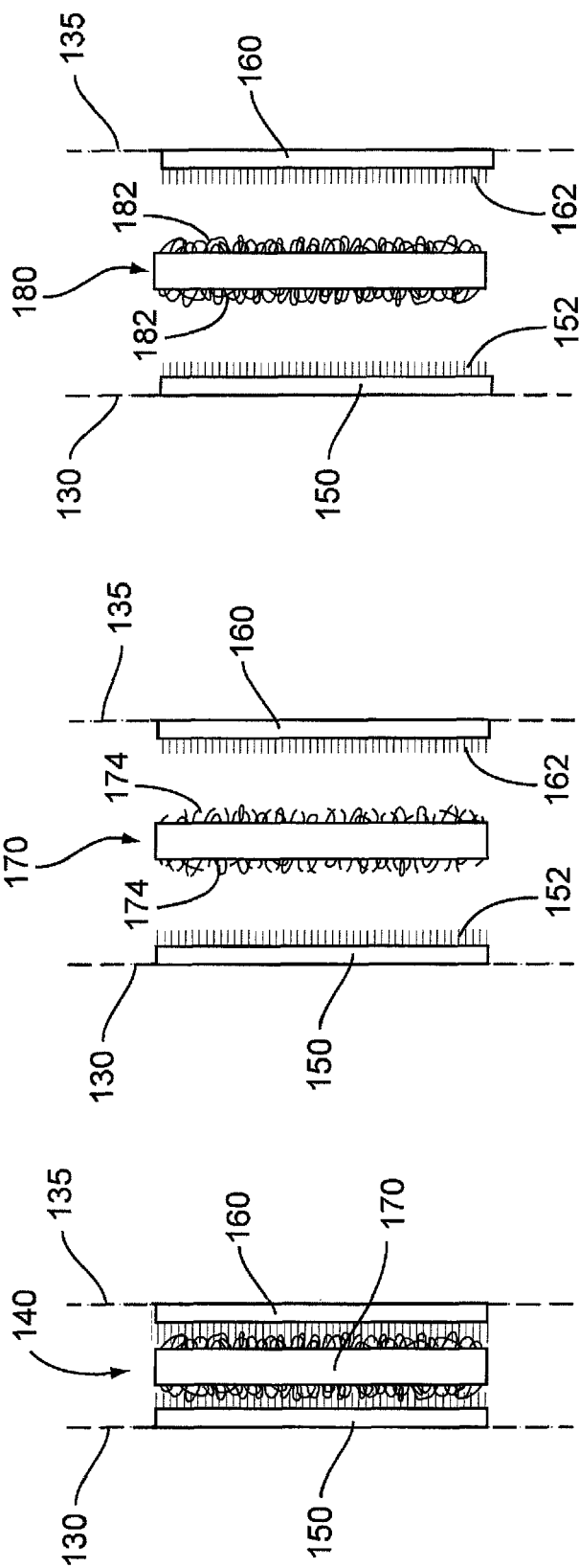

PROTECTIVE COVER FOR SLINGS, ROPES, CABLES AND THE LIKE

FIELD OF THE INVENTION

The present invention is related to protective covers for slings, ropes, cables, mooring lines, and particularly to sling covers having high shear strength, releasable, but reusable fastening systems. Such cables, ropes, and slings are used to tie down ships or airplanes, or to carry heavy loads, such as equipment for underwater mining operations, oil-rigs, oil-rig equipment, heavy-duty manufacturing, large engineering structures, retrieval operations, and the like. The covers for such lines must have a high shear strength, withstand chafe and abrasion, salt water, and harsh conditions.

BACKGROUND

Mooring lines, slings, cables, and ropes are sometimes used in extreme wear conditions and must be protected. Slings, for example, are used in many forms as a support for equipment, objects, or other heavy loads used underwater, as in underwater oil rigs that need to be emplaced, removed, or moved from one location to another. These slings may be attached to heavy-duty cables that are secured to a winch or crane. The cables and slings are used to lift and support the object for transport. The slings are sometimes provided with protective covers to prevent damage by abrasion, barnacles, chemicals, salt water, etc. The covers are conventionally attached to slings with hook and loop fasteners.

In some cases, the slings are left with the object at a location, for retrieval and use at a later time. Offshore mining operations use this strategy by leaving equipment, along with the slings that carried the equipment, on the ocean floor for later use or inspection. When the equipment is due for inspection, or in need of replacement, the cables are lowered to the desired equipment and attached to the slings. The equipment is then lifted to the surface for inspection. The slings themselves are also inspected and replaced as needed. The process is similar for underground mining operations, industrial manufacturing operations, or other situations where it is efficient to leave a sling with the object.

To ensure the sling is not used beyond its useful life, the cover must be removed and the sling inspected as often as practicable. A thorough inspection may involve a review of the exterior and interior surfaces, cable attachments, closure mechanisms and general condition of the cover. Thus, the use of hook and loop re-closable closures or fasteners, may help minimize cover replacement costs. For heavy duty operations, such as the offshore mining operations described above, this cost savings could be significant. Ships, airplanes, and heavy vehicles also utilize mooring lines, cables, ropes, and the like in conditions of extreme wear and must be similarly protected.

SUMMARY OF THE INVENTION

Fabric closure systems for heavy duty applications, however, must utilize what is referred to as a "high shear strength" hook and loop fastener (e.g. Velcro USA's Vel-Loc® brand, Quadralobal Mushroom Hook and corresponding loop styles). Such high shear strength hook and loop fasteners have a very limited life cycle because the pulling of the mushroom-shaped hooks back through the loops often breaks the loops which destroys the ability to fasten. Thus, the protective covers that use such closures are not cost effective, particularly when used in long-term, underwater environments. For example, these closures may only be used once or twice before the closure or fastener stability detrimentally impacts usefulness of the cover around the sling, and the entire cover must be discarded.

One aspect of the invention, therefore, is the recognition that a need exists for a durable, high shear strength fastener system that has a longer life cycle than has been known to date. Such a fastener system is desirable, for example, as a closure device for protective covers for slings used to carry a heavy load, particularly into undersea environments.

Another aspect of the invention is a durable rope, cable, or sling cover for heavy wear or harsh environments that also requires a high shear strength, reusable hook and loop fastener system. The cover includes a fabric sheet formed substantially of ultra high molecular weight polyethylene yarns capable of withstanding the harsh environments. The cover includes a high shear strength hook and loop fastener system connecting the first and second opposing edges of the cover. The high shear strength hook and loop fastener system comprises areas each containing a of plurality of hooks along opposing edges of the cover, and an intermediate disposable strip having a plurality of loops on both sides which connects both opposing edges of the cover. The covers wrap around the cable, rope, or sling so that a portion of the first edge and second edge overlap with the intermediate disposable strip to form the reusable, high shear strength hook and loop connection. Because of its inability to withstand repeated openings and closings, the life of the fastener system is extended by replacing merely the disposable strip.

Another aspect of the invention is the high shear strength, reusable, releasable hook and loop system itself, which provides a durable connection between any two surfaces. The fastener system includes a first strip of mushroom-shaped hooks on a first surface and a second strip of mushroom-shaped hooks on a second surface. An intermediate disposable strip has a plurality of loops on both sides. The plurality of loops form a durable, high shear strength connection with the first and second strips of mushroom-shaped hooks. The releasable hook and loop system is configured so that when the hooks are separated from the loops, the intermediate disposable strip is discarded and is replaced with a new intermediate disposable strip.

BRIEF DESCRIPTION OF THE DRAWINGS

FIGS. 3A and 3B are top and side views of a protective cover; and

FIGS. 4A through 4C illustrates schematically the fastener system itself.

DETAILED DESCRIPTION

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications, and improvements are within the scope of the present invention.

Figure 1:
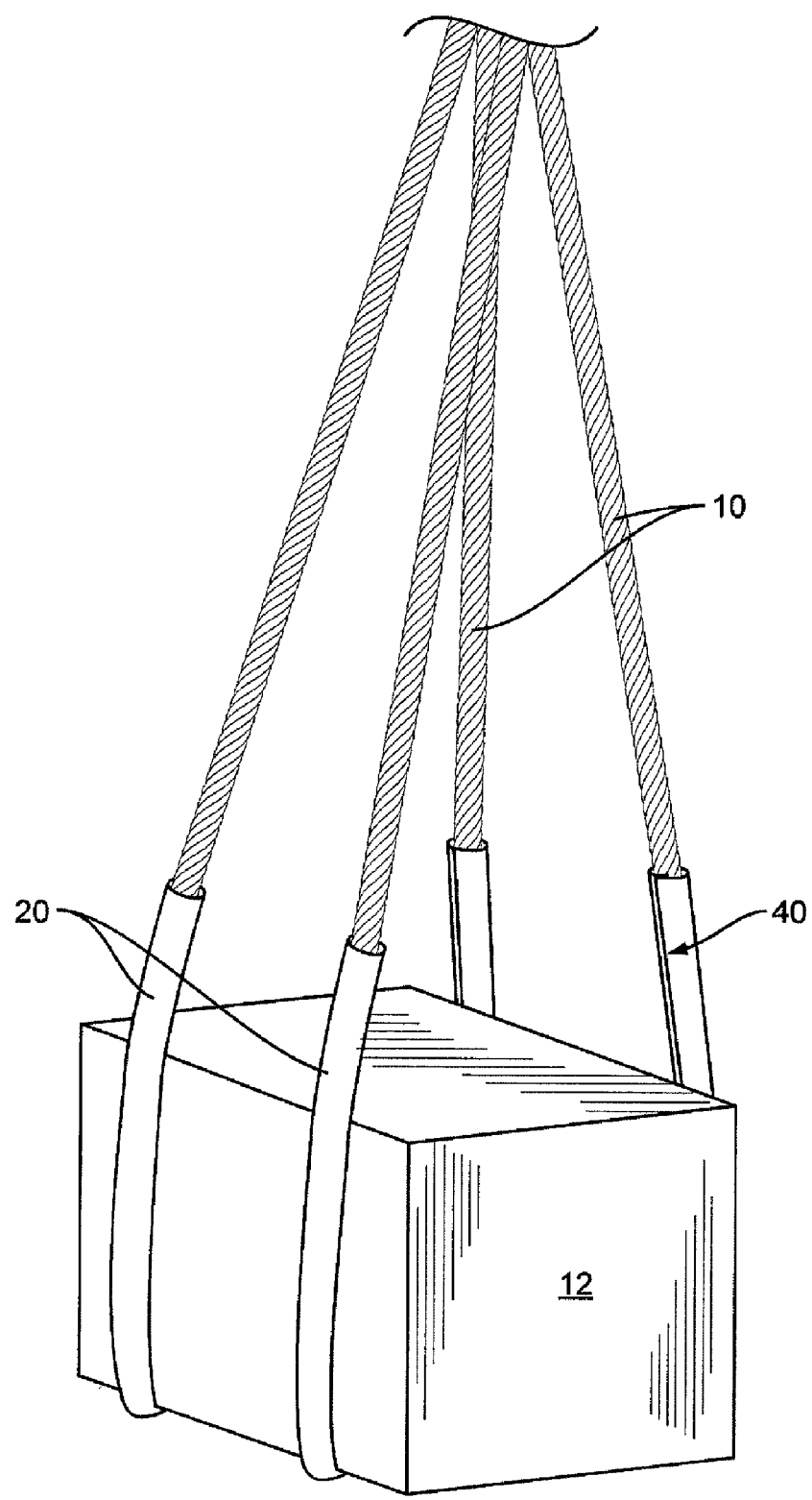
FIG. 1 shows an environmental view of slings carrying a load and being provided with the protective covers of the present invention.
Figure 2:
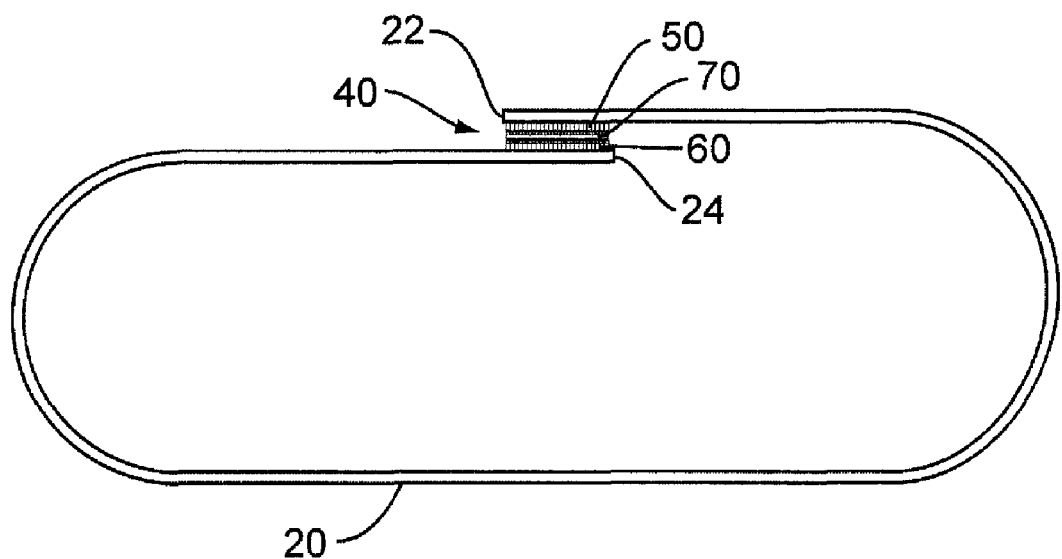
FIG. 2 shows a side view of a protective cover with a cable, rope, or sling removed and the relationship of the two hook strips and the intermediate loop strips.

As shown in FIGS. 1 and 2, load 12 is carried by sling 10 which may be one or several ropes or cables. A protective cover 20 wraps around sling 10 and is secured in place with the high shear strength durable, reusable fastener system 40 of the present invention. The cover may be used with any type of rope or cable, or with a sling for carrying a load 12. The term "sling" includes, but is not limited to, looped lines formed of heavy-duty cordage, wires, cables and ropes. More than one or two slings may be used to carry the load 12 as the need arises. The cover 20 is flexible and may accommodate any type of sling, such as a circular, or, a relatively flat sling. The protective cover 20 is configured to extend the useful life of the sling 10, protect the sling 10 against exposure, and minimize any chaffing experienced by the sling 10 during its useful life. While a sling is illustrated in FIG. 1 by way of example, the cover is equally usable on the other cables, ropes, mooring lines or the like.

As shown in FIG. 2, the fastener system 40 secures overlapping edges 22 and 24 of the cover 20 around a rope or sling 10 (sling not shown). The fastener system 40 includes first and second strips 50 and 60, each having a plurality of mushroom-shaped hooks (e.g. Velcro USA's Vel-Loc® brand, Quadralobal Mushroom Hooks) and an intermediate disposable strip of corresponding loops 70. The intermediate disposable strip 70 includes a plurality of loops on both sides (double sided) that receive and form a durable, high shear strength and releasable connection with the first and second strips 50 and 60.

The cover 20 is wrapped around the rope or sling 10 so that the hooks on the first and second strips 50 and 60 overlap and engage the intermediate disposable strip 70 to form a durable, releasable, connection. The phrase "high shear strength" means a connection that is not readily removable without a force of at least 36.5 lbs/sq. in. The cover 20 may be re-opened by removing the first and second strips 50 and 60 from the intermediate strip 70. This removal generally destroys or breaks a number of the loops, limiting the usefulness for receiving hooks on the strip 70. The intermediate strip 70 is replaced by a second, new intermediate strip, having a similar loop structure. As the hooks of strips 50 and 60 are undamaged, any number of intermediate disposable strips are used to extend the useful life of the cover 20, by maintaining a durable, releasable connection thereon.

As shown in FIGS. 2, 3A and 3B, an exemplary cover 20 is a fabric sheet that may be formed by a single layer 30. An exemplary layer 30 is formed with ultra high molecular weight polyethylene yarns, e.g., SPECTRA®. The denier of the warp and fill yarns may range from about 300 to about 1,500 with warp and fill density of about 10 to 42 yarns per inch each, depending on the weight desired. In one simple embodiment, the single layer has yarns with a denier of about 650, a warp and a fill density of about 35×35 yarns per inch each, and weight of about 6.3 ounces per square yard. In another embodiment, the fabric sheet has yarns with a denier of about 1200, a warp and fill density of about 34×34 yarns per inch each, and weight of about 10.7 ounces per square yard. However, the range of possible deniers and warp and fill density are not limited to this range. As those skilled in the art will appreciate, a lighter or heavier fabric having a more open or more closed weave may be selected to construct a fabric layer cover for any range of specialized applications. The weave pattern may vary e.g. plain weave, twill weave, basket weave, and others. A layer might feasibly even be knit. The range of parameters of this single layer fabric sheet is designed to provide a fabric that is extremely lightweight and flexible, while also providing sufficient strength and long-lasting durability to withstand the use and environment to which the cover may be exposed.

Another exemplary embodiment of the fabric cover 20 is formed with a first and second layer. The first and second layers may have different yarn, denier, weight, and warp and fill densities, as needed. In one embodiment, the first layer forms the outer surface of the fabric sheet and has larger denier, higher weight, and lower warp/fill densities than the second layer that forms the inner surface of the cover. For example, the first outer layer has yarns with a denier of about 1200, a warp and fill density of about 34×34 yarns per inch, and weight of about 10.7 ounces per square yard. The outer layer is woven in a basket weave pattern. The second inner layer has yarns with a denier of about 650, a warp and fill density of about 35×35 yarns per inch each, and weight of about 6.3 ounces per square yard. This layer is woven in a plain weave pattern. The first and second layers are stitched together using a heavy duty thread. In other embodiments, the first and second layers and form a laminate via hot-melt bonding, adhesives, chemical bonding, stitch-bonding, or other processes appropriate for the end-use environment.

In other embodiments, in order to make the fabric water and chemical resistant, a thermoplastic film is bonded on a single side of the fabric sheet. This would add about 6 oz/sq. yd. to the product. In other alternate embodiments, thermoplastic films are bonded to both sides of the fabric sheet. The thermoplastic films include, but are not limited to, ethylene vinyl acetate (EVA), polyethylene, LDPE, HDPE and the like. Further, the protective cover 20 may be formed of one or more layers of fabric-film laminate. In other embodiments, the cover 20 is formed of a fabric layer and fabric-film laminate, as the need may arise.

As shown in FIGS. 2, 3A and 3B, the first and second strip of hooks 50 and 60 are attached along opposing edges 22 and 24, of the cover 20 respectively. Referring to FIG. 3A, an exemplary fastener system 40 includes strips of hooks 50 and 60 that extend along the length of the fabric layer edges 22 and 24. In alternate embodiments, a plurality of strips may be attached along the edges of the cover 20. In still other embodiments, the strips of hooks 50 and 60 may extend along only portions of the edges 22 and 24. In an exemplary embodiment, the first and seconds strips are about 2 in. (5.08 cm) wide, and extend substantially the entire length of the cover 20.

As shown in FIGS. 3A and 3B, the first and second strips of hooks 50 and 60 are attached to opposing surfaces 26 and 28, of the cover 20, respectively along opposite edges thereof. The strips of hooks 50 and 60 may be stitched onto the cover 20 using a heavy duty thread. However, the strips of hooks 50 and 60 may also be secured to the fabric layers using any number of methods, such as adhesives, hot-melt bonding, chemical bonding, stitch bonding, lamination, and the like. As the need may arise, the first and second strips of hooks 50 and 60 could also be placed on the same surface of the cover 20 along opposite edges. In still other alternate embodiments, the plurality of hooks are formed as an integral part of the fabric layers.

The plurality of hooks used on the first and second strips 50 and 60 are configured to create a high shear strength releasable connection with the intermediate strip 70. The hooks differ from ordinary Velcro® hooks in that they have a mushroom shape. Preferably, the hook is a quadralobal mushroom type hook. The hooks are arranged on the strip in a grid pattern, a staggered grid pattern, or other pattern designed to improve the shear strength of the fastener system. The hooks are formed from any polymer, such as polyamide (nylon), polypropylene, or polyethylene terepthalate. In other embodiments, the hooks are formed of two polymers. The hook support surface may be a nylon material with a polypropylene head, or cap. In an exemplary embodiment, the plurality of hooks have a peel strength of at least about 3.0 lbs./sq. in (0.53 kg/sq. cm) and a shear strength of at least about 36.5 lbs./sq. in (0.651. kg/sq. cm), tested against "Loop 1000" available from Velcro USA Inc. An exemplary strip of hooks is VEL-LOC® # P87S available from Velcro USA Inc. In other embodiments, the hooks have any configuration that provides a high shear strength, durable, and releasable fastener as described herein.

The intermediate strip 70 includes a plurality of loops on either side. In an embodiment, the intermediate strip 70 may be formed with two strips, each having loops extending therefrom. The two strips may be sewn together or otherwise combined using adhesives, lamination or other methods known to those of skill in the art. In alternate embodiments, the plurality of loops are integrally formed on either side of a single strip. The loops on the intermediate strips are designed to provide the high shear strength connection with the strips of hooks 50 and 60. The loops tend to break after the initial, or at the most, after a limited number of occurrences of strips 50 and 60 being removed from intermediate disposable strip 70. In the exemplary embodiment, the loops may be polyamide, polypropylene, or polyethylene terephthalate and may be nonwoven, woven or knitted.

Another aspect of the invention is an improved fastener system 140 as shown in FIGS. 4A through 4C regardless of the surfaces being joined, so long as a high shear strength, releasable and renewable connection is needed. The fastener system includes a first strip 150, a second strip 160 and an intermediate strip 170. The first strip 150 may be secured to the surface 130 and the second strip 160 is secured to the second surface 135. The first and second surfaces 130 and 135 can be any surface. Exemplary surfaces include fabrics, laminate, a wall, the side of a structure, or any other surfaces that may need to be joined to another surface.

As shown in FIG. 4A, the plurality of hooks on either strip 150 and 160 form a high shear strength, durable connection with the loops on the intermediate strip 170. As shown in FIG. 4B, removal of strips 150 and 160 forms broken loops 174, limiting the ability of the intermediate strip 170 to re-form a durable connection with the hooks 152 and 162. To reattach the two surfaces 130 and 135, a second, replacement intermediate strip 180 with loops 182 on either side is placed between the first and second strips 150 and 160 to form a high shear strength, durable connection between the surfaces 130 and 135 (surfaces shown in hidden lines).

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A protective cover for a rope, cable, or sling comprising:
   a fabric sheet formed substantially of ultra high molecular weight polyethylene yarns and having first and second opposing edges;
   a high shear strength, renewable and releasable hook and loop fastener system releasably connecting the first and second opposing edges and comprising
   a) areas containing a plurality of mushroom-shaped hooks extending along the first and second opposing edges;
   b) an intermediate disposable strip having a plurality of loops on each side thereof and so configured as to receive the areas having the plurality of hooks; and
   whereby when the cover is wrapped around the rope, cable, or sling so that a portion of the first edge and second edge overlap with the intermediate disposable strip, and the edges are pressed against the intermediate disposable strip, the high shear strength, releasable connection is formed.

2. The cover of claim 1, wherein the plurality of hooks are mushroom-shaped.

3. The cover of claim 1 wherein the hook and loop fastener system has a shear strength of at least 36.0 lb/sq. in.

4. The cover of claim 1, wherein at least some of the plurality of loops on the disposable strip break when removed from the areas of the plurality of hooks.

5. The cover of claim 1, wherein the fabric sheet comprises
   a first area of plurality of hooks along one edge of a first side of the fabric sheet, and
   a second area of plurality of hooks along the other edge of a second side of the fabric sheet.

6. The cover of claim 1, wherein the intermediate disposable strip has shape that mates with the first and second areas of plurality of hooks.

7. The cover of claim 1, wherein the plurality of loops are selected from the group consisting of woven loops, knitted loops, or nonwoven loops, or combinations thereof.

8. The cover of claim 1, further comprising at least a second intermediate disposable strip, the second intermediate disposable strip replaces the first intermediate disposable strip upon removal from the connection of hook and loop fasteners.

9. The cover of claim 1, wherein the fabric sheet further comprises a thermoplastic film bonded to at least one side thereof.

* * * * *